(12) United States Patent
Muthiah et al.

(10) Patent No.: US 11,126,371 B2
(45) Date of Patent: Sep. 21, 2021

(54) CACHING FILE DATA WITHIN A CLUSTERED COMPUTING SYSTEM

(71) Applicant: International Business Machines Corporation, Armonk, NY (US)

(72) Inventors: Muthu Annamalai Muthiah, Chennai (IN); Deepak Kumar Jha, Bangalore (IN); Karrthik K G, Kodaikanal (IN); Prashanth Shekar Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/402,917

(22) Filed: May 3, 2019

(65) Prior Publication Data
US 2020/0348882 A1   Nov. 5, 2020

(51) Int. Cl.
*G06F 3/06* (2006.01)
*G06F 12/126* (2016.01)
*G06F 16/185* (2019.01)

(52) U.S. Cl.
CPC ............ *G06F 3/0656* (2013.01); *G06F 3/067* (2013.01); *G06F 3/0611* (2013.01); *G06F 12/126* (2013.01); *G06F 16/185* (2019.01)

(58) Field of Classification Search
None
See application file for complete search history.

(56) References Cited

U.S. PATENT DOCUMENTS

| | | | | |
|---|---|---|---|---|
| 9,021,296 B1* | 4/2015 | Kiselev | ................. | G06F 3/0647 714/6.23 |
| 2002/0133537 A1* | 9/2002 | Lau | ..................... | H04L 67/1023 709/203 |
| 2011/0035376 A1* | 2/2011 | Kirshenbaum | ....... | G06F 16/137 707/737 |
| 2012/0297141 A1* | 11/2012 | Aronovich | .......... | G06F 21/6218 711/133 |
| 2016/0103845 A1 | 4/2016 | Yeddanapudi et al. | | |
| 2016/0299919 A1 | 10/2016 | Cramer et al. | | |

OTHER PUBLICATIONS

Mell et al., "The NIST Definition of Cloud Computing," Recommendations of the National Institute of Standards and Technology, NIST Special Publication 800-145, Sep. 2011, pp. 1-7.
Mell et al., "The NIST Definition of Cloud Computing," Version 15, Dec. 7, 2009, pp. 1-2.

(Continued)

*Primary Examiner* — William E. Baughman
(74) *Attorney, Agent, or Firm* — Zilka-Kotab, P.C.

(57) ABSTRACT

A computer-implemented method according to one embodiment includes receiving, from an application at a metadata node of a clustered computing system, a request for a file, identifying, by the metadata node, a subset of data nodes within the clustered computing system where a portion of the file is stored, determining, by the metadata node, a data node within the subset of data nodes storing the portion of the file in a cache of the data node, and returning to the application, by the metadata node, a location of the portion of the file at the data node storing the portion of the file in the cache of the data node.

15 Claims, 9 Drawing Sheets

(56) References Cited

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

Moise et al., "Optimizing Intermediate Data Management in MapReduce Computations," CloudCP 2011, 1st International Workshop on Cloud Computing Platforms, Apr. 2011, 8 pages.

Brinker et al., "Accelerating Hadoop MapReduce Using an In-Memory Data Grid," ScaleOut Software, Inc., 2013, 9 pages.

Kim et al., "Shuffling Optimization in Hadoop M/R," Fall CS 492 Presentation, Dec. 15, 2008, 7 pages, retrieved from https://www.slideshare.net/lurker86/shuffling-optimization-in-hadoop-presentation.

\* cited by examiner

CACHING FILE DATA WITHIN A CLUSTERED COMPUTING SYSTEM

BACKGROUND

The present invention relates to data storage and retrieval, and more specifically, this invention relates to caching file data within a clustered computing system.

Clustered computing systems are frequently used to store data and to provide access to that data to a variety of applications. However, in many circumstances, nodes of current clustered computing systems store file portions in persistent memory of the node, which results in slow data retrieval, hindering application performance as well as overall system performance.

SUMMARY

A computer-implemented method according to one embodiment includes receiving, from an application at a metadata node of a clustered computing system, a request for a file, identifying, by the metadata node, a subset of data nodes within the clustered computing system where a portion of the file is stored, determining, by the metadata node, a data node within the subset of data nodes storing the portion of the file in a cache of the data node, and returning to the application, by the metadata node, a location of the portion of the file at the data node storing the portion of the file in the cache of the data node.

According to another embodiment, a computer program product for caching file data within a clustered computing system includes a computer readable storage medium having program instructions embodied therewith, where the computer readable storage medium is not a transitory signal per se, and where the program instructions are executable by a processor to cause the processor to perform a method including receiving, from an application by the processor at a metadata node of a clustered computing system, a request for a file, identifying, by the processor at the metadata node, a subset of data nodes within the clustered computing system where a portion of the file is stored, determining, by the processor at the metadata node, a data node within the subset of data nodes storing the portion of the file in a cache of the data node, and returning to the application, by the processor at the metadata node, a location of the portion of the file at the data node storing the portion of the file in the cache of the data node.

According to another embodiment, a system includes a processor, and logic integrated with the processor, executable by the processor, or integrated with and executable by the processor, where the logic is configured to receive, from an application at a metadata node of a clustered computing system, a request for a file, identify, by the metadata node, a subset of data nodes within the clustered computing system where a portion of the file is stored, determine, by the metadata node, a data node within the subset of data nodes storing the portion of the file in a cache of the data node, and return to the application, by the metadata node, a location of the portion of the file at the data node storing the portion of the file in the cache of the data node.

Other embodiments and embodiments of the present invention will become apparent from the following detailed description, which, when taken in conjunction with the drawings, illustrate by way of example the principles of the invention.

DETAILED DESCRIPTION

Figure 1:
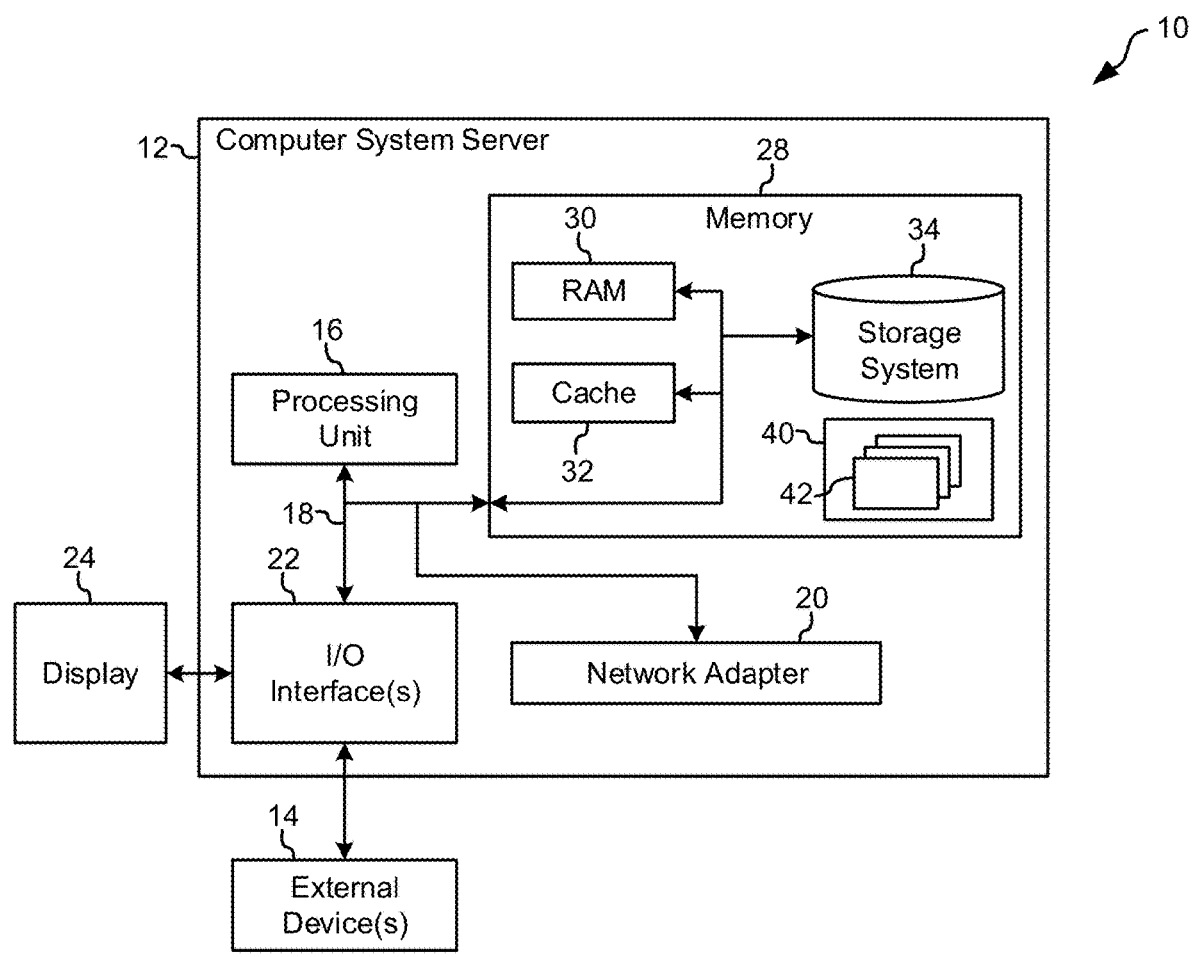
FIG. 1 depicts a cloud computing node according to an embodiment of the present invention.

The following description discloses several preferred embodiments of systems, methods and computer program products for caching file data within a clustered computing system. Various embodiments provide a method for storing portions of a file in available cache locations of data nodes within a clustered computing system in order to improve data management within the clustered computing system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for caching file data within a clustered computing system.

In one general embodiment, a computer-implemented method includes receiving, from an application at a metadata node of a clustered computing system, a request for a file, identifying, by the metadata node, a subset of data nodes within the clustered computing system where a portion of the file is stored, determining, by the metadata node, a data node within the subset of data nodes storing the portion of the file in a cache of the data node, and returning to the application, by the metadata node, a location of the portion of the file at the data node storing the portion of the file in the cache of the data node.

In another general embodiment, a computer program product for caching file data within a clustered computing system includes a computer readable storage medium having program instructions embodied therewith, where the computer readable storage medium is not a transitory signal per se, and where the program instructions are executable by a processor to cause the processor to perform a method including receiving, from an application by the processor at a metadata node of a clustered computing system, a request for a file, identifying, by the processor at the metadata node, a subset of data nodes within the clustered computing system where a portion of the file is stored, determining, by the processor at the metadata node, a data node within the subset of data nodes storing the portion of the file in a cache of the data node, and returning to the application, by the processor at the metadata node, a location of the portion of the file at the data node storing the portion of the file in the cache of the data node.

In another general embodiment, a system includes a processor, and logic integrated with the processor, executable by the processor, or integrated with and executable by the processor, where the logic is configured to receive, from an application at a metadata node of a clustered computing system, a request for a file, identify, by the metadata node, a subset of data nodes within the clustered computing system where a portion of the file is stored, determine, by the metadata node, a data node within the subset of data nodes storing the portion of the file in a cache of the data node, and return to the application, by the metadata node, a location of the portion of the file at the data node storing the portion of the file in the cache of the data node.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
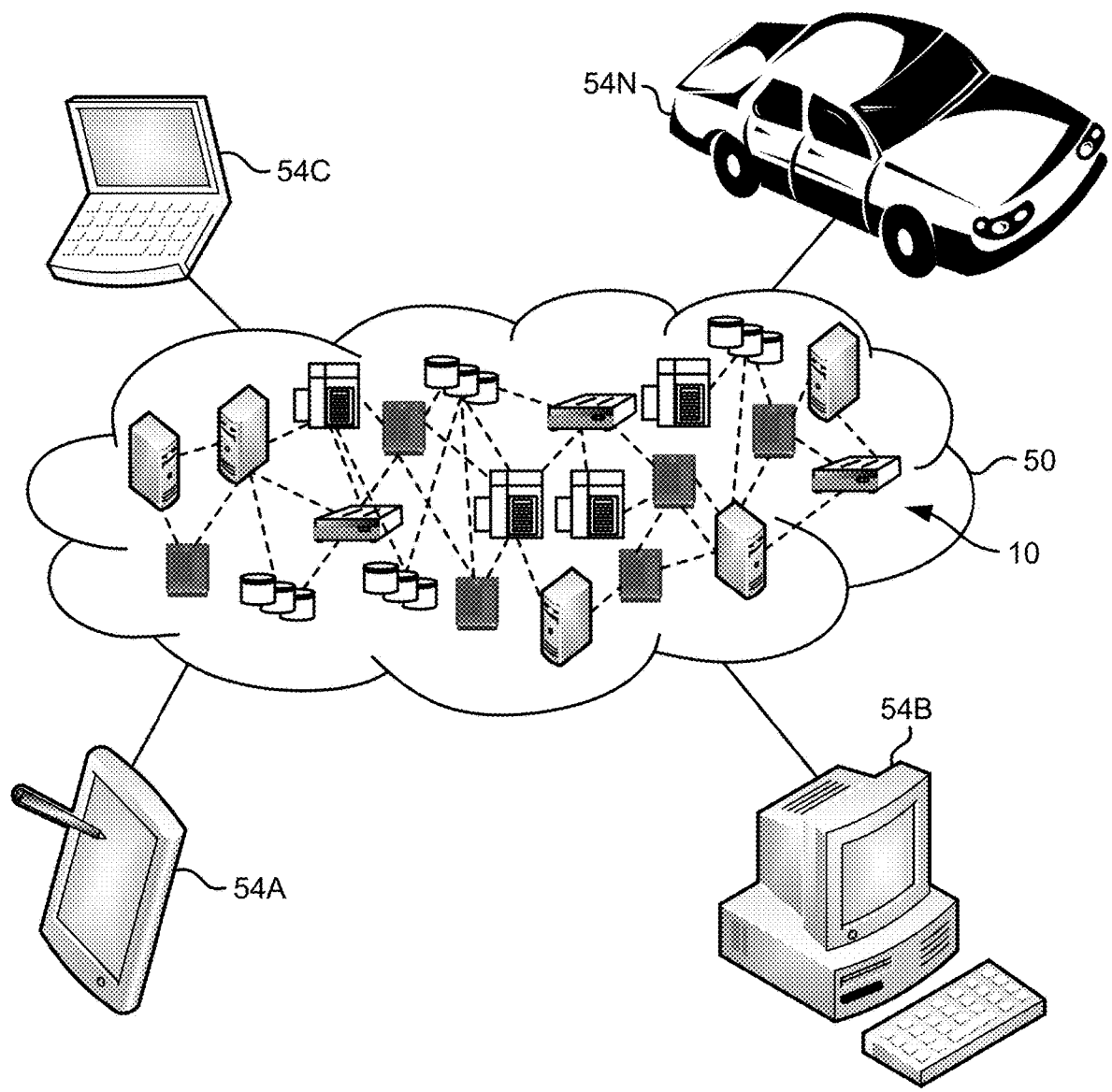
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
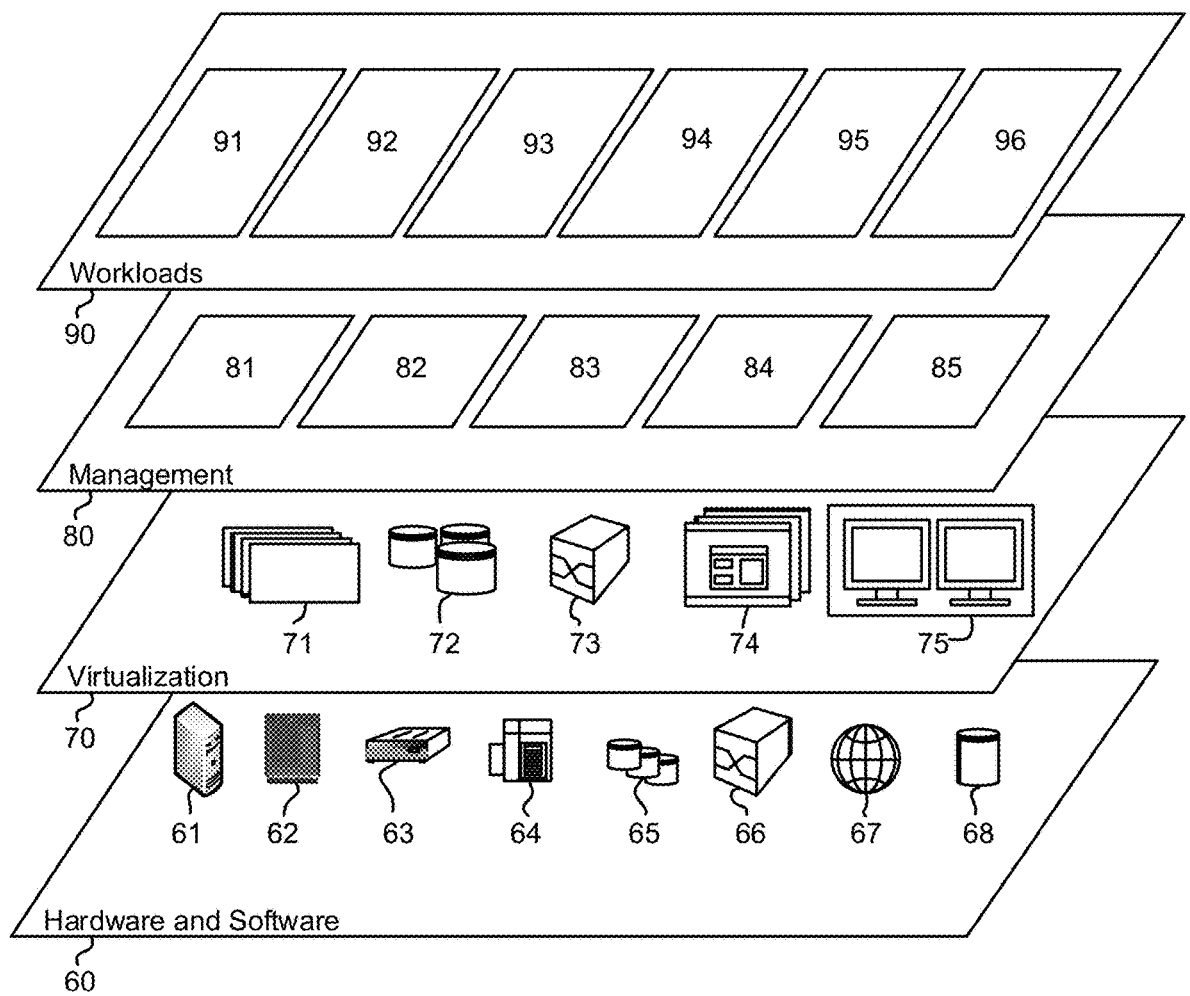
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data caching 96.

Figure 4:
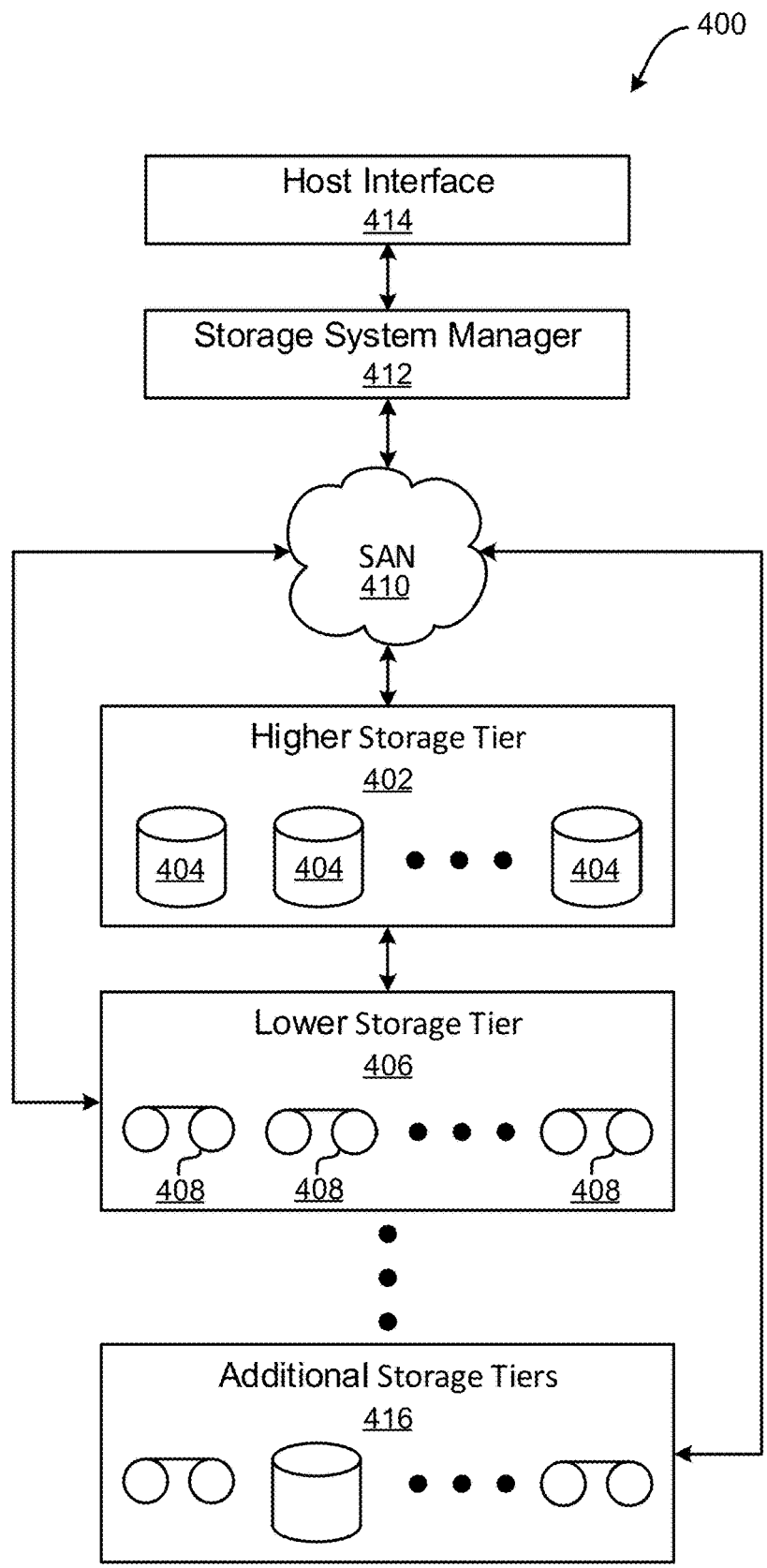
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
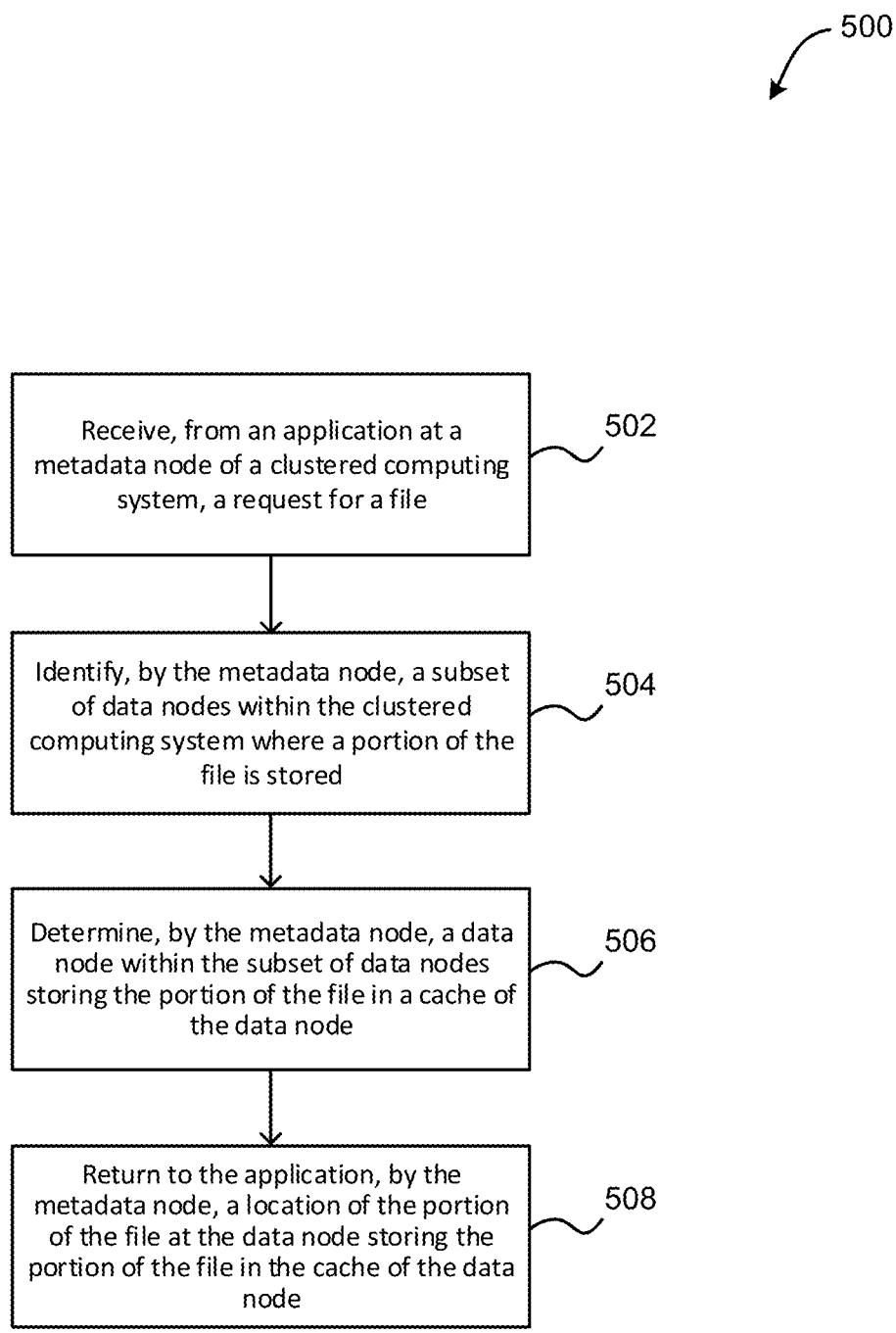
FIG. 5 illustrates a flowchart of a method for caching file data within a clustered computing system, in accordance with one embodiment.

Now referring to FIG. 5, a flowchart of a method 500 is shown according to one embodiment. The method 500 may be performed in accordance with the present invention in any of the environments depicted in FIGS. 1-4 and 9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request for a file is received from an application at a metadata node of a clustered computing system. In one embodiment, the application may be located on a node of the clustered computing system (e.g., at a data node within the clustered computing system, etc.). In another embodiment, the application may be located on a computing device separate from the clustered computing system (e.g., at a client computer separate from the clustered computing system, etc.).

Additionally, in one embodiment, the clustered computing system may include a plurality of computing nodes that work together to perform one or more tasks (e.g., data storage, computation, etc.). In another embodiment, the clustered computing system may include a clustered storage system, a cloud computing system, etc. In yet another embodiment, the clustered computing system may include a plurality of data nodes that store file data, and a metadata node that stores metadata indicating a location of the file data within the data nodes. In still another embodiment, the metadata node may include a name node.

Further, method 500 may proceed with operation 504, where a subset of data nodes within the clustered computing system where a portion of the file is stored is identified by the metadata node. In one embodiment, the plurality of data nodes may each include a clustered computing device. In another embodiment, the file may be stored as a plurality of different portions within the clustered computing system.

Further still, in one embodiment, upon receipt or creation of the file within the clustered computing system, the file may be divided into a plurality of different portions. For example, data that is received by or created at the clustered computing system may be segmented into a plurality of portions (e.g., data blocks, etc.) and may be distributed amongst a plurality of data nodes within the clustered computing system.

Also, in one embodiment, each of the plurality of different portions may be stored on a different data node within the clustered computing system. In another embodiment, to implement data redundancy within the clustered computing system, multiple instances of a single portion of the file may be stored on different data nodes within the clustered computing system.

In addition, method 500 may proceed with operation 506, where a data node within the subset of data nodes storing the portion of the file in a cache of the data node is determined by the metadata node. In one embodiment, each of the subset of data nodes may store the portion of the file within the data node. In another embodiment, one of the subset of data nodes may store the portion of the file in a cache of the data node.

For example, the cache may include random access memory (RAM) of the data node, flash memory of the data node, etc. In another example, the cache may include a pinned portion of RAM that is temporarily allocated for and used by a daemon located within the data node (e.g., a page pool, etc.). In yet another example, the cache may include a portion of RAM that is dynamically allocated for use by a plurality of different applications, services, processes, etc., and that is accessible by the daemon.

Furthermore, in one embodiment, the remaining data nodes of the subset of data nodes may store the portion of the file in persistent storage of the data node. For example, the persistent storage may include a hard disk drive (HDD) of the data node, a tape drive of the data node, a media drive of the data node, etc.

Further still, method 500 may proceed with operation 508, where a location of the portion of the file at the data node storing the portion of the file in the cache of the data node is returned to the application by the metadata node. In one embodiment, in response to the request for the file, the metadata node may identify locations of all portions of the file at data nodes within the clustered computing system. In another embodiment, the metadata node may return the locations of all portions of the file to the application.

Also, in one embodiment, if it is determined that no data node within the subset of data nodes is currently caching the data node, a location of the first portion of the file at persistent storage of one of the subset of data nodes may be returned to the application. For example, the metadata node may also determine one of the subset of data nodes that has cache space available, and may send a request to that node to transfer the portion of the file from persistent storage of the node to the available cache space of the node.

In this way, the metadata node may manage data caching within data nodes, and may prioritize cached portions of the file when returning file portion locations to the application. This may increase an amount of data that is retrieved from caches of the data nodes instead of persistent storage, which may improve a speed of data retrieval within the clustered computing system. This may also improve a performance of the requesting application, as requested data will be retrieved and available to the application at a faster rate.

Figure 6:
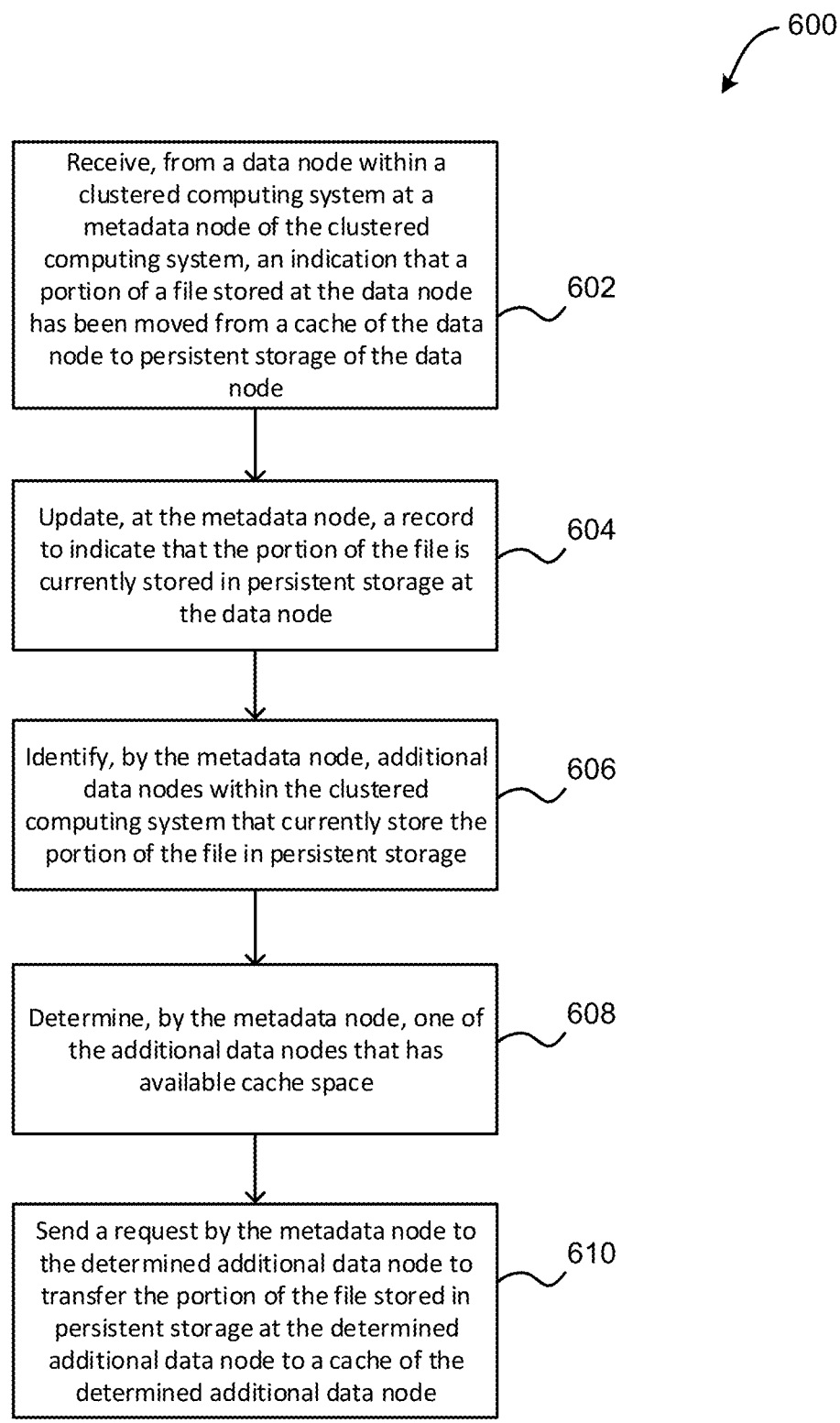
FIG. 6 illustrates a flowchart of a method for updating a metadata node in response to a cache flush at a data node, in accordance with one embodiment.

Now referring to FIG. 6, a flowchart of a method 600 for updating a metadata node in response to a cache flush at a data node is shown according to one embodiment. The method 600 may be performed in accordance with the present invention in any of the environments depicted in FIGS. 1-4 and 9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an indication that a portion of a file stored at the data node has been moved from a cache of the data node to persistent storage of the data node is received from a data node within a clustered computing system at a metadata node of the clustered computing system. In one embodiment, a storage daemon within the data node may move the portion of the file from the cache to the persistent storage of the data node in response to a request for use of the cache space by a higher priority application/service/process within the node. In another embodiment, the storage daemon may send the indication to the metadata node within the clustered computing system.

Additionally, method 600 may proceed with operation 604, where a record is updated at the metadata node to indicate that the portion of the file is currently stored in persistent storage at the data node. In one embodiment, the metadata node may store metadata indicating a location of each portion of the file within the clustered computing system. In another embodiment, the metadata may indicate a storage node within the clustered computing system that is currently storing each portion of the file. In yet another embodiment, the metadata may also indicate whether a portion of the file is stored within a cache of the storage node or persistent storage within the storage node.

Further, method 600 may proceed with operation 606, where additional data nodes within the clustered computing system that currently store the portion of the file in persistent storage are identified by the metadata node. In one embodiment, the portion of the file may be replicated and stored in multiple data nodes within the clustered computing system (for purposes of redundancy and data security). In another embodiment, a single data node may store the portion of the file in cache storage, and additional data nodes may store the portion of the file in persistent storage. For example, then the single data node storing the portion of the file in cache storage transfers the portion of the file to persistent storage, the portion of the file is no longer stored in a cache of a storage node within the clustered computing system.

Further still, method 600 may proceed with operation 608, where the metadata node determines one of the additional data nodes that has available cache space. In one embodiment, the metadata node may ping the additional data nodes with a request asking whether each of the additional data nodes has available cache space. In another embodiment, if more than one of the additional data nodes has available cache space, the metadata node may randomly select one of the additional data nodes that has available cache space, or may select a data node according to a predetermined priority. In yet another embodiment, the metadata node may monitor the storage nodes and may maintain metadata indicating a current availability of a cache for each of the data nodes.

Also, method 600 may proceed with operation 610, where a request is sent by the metadata node to the determined additional data node to transfer the portion of the file stored in persistent storage at the determined additional data node to a cache of the determined additional data node. In one embodiment, the metadata node may send the request to a storage daemon within the determined additional data node. In another embodiment, the storage daemon may manage the transfer of the portion of the file from the persistent storage of the node to the cache of the node.

In this way, the metadata node may maintain the portion of the file in a cache of a data node within the clustered computing system. This may improve a retrieval time of the portion of the file in response to a request for the file.

Figure 7:
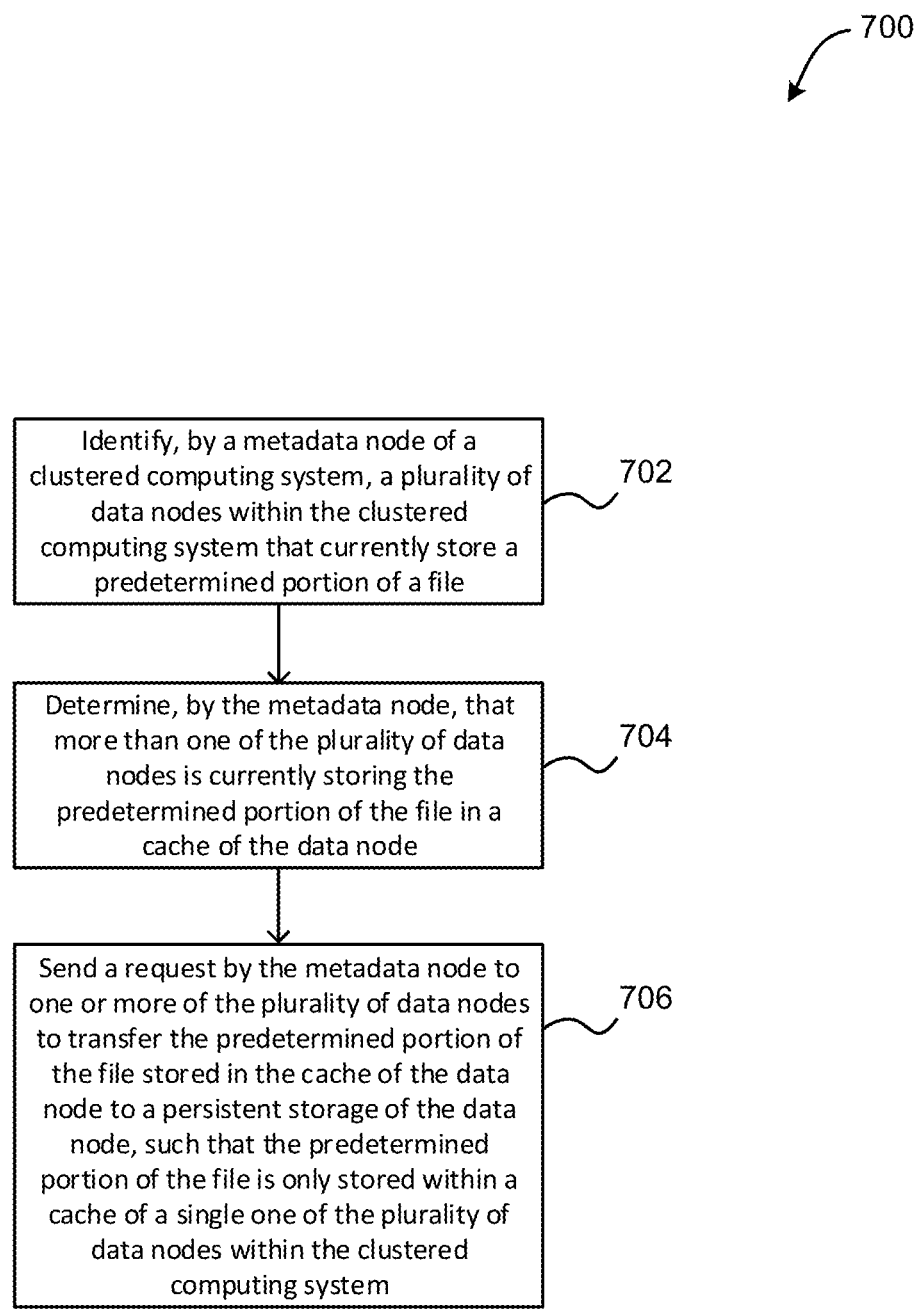
FIG. 7 illustrates a flowchart of a method for performing cache balancing within a clustered computing system, in accordance with one embodiment.

Now referring to FIG. 7, a flowchart of a method 700 for performing cache balancing within a clustered computing system is shown according to one embodiment. The method 700 may be performed in accordance with the present invention in any of the environments depicted in FIGS. 1-4 and 9, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a plurality of data nodes within the clustered computing system that currently store a predetermined portion of a file are identified by a metadata node of a clustered computing system. In one embodiment, multiple data nodes may store the same portion of the file due to data redundancy for data security purposes. In another embodiment, the metadata node may store metadata indicating a location of the predetermined portion of the file within the clustered computing system.

Additionally, method 700 may proceed with operation 704, where it is determined by the metadata node that more than one of the plurality of data nodes is currently storing the predetermined portion of the file in a cache of the data node. In one embodiment, the metadata node may also store metadata indicating whether the predetermined portion of the file is stored within a cache or persistent storage of each storage node storing the predetermined portion of the file. In another embodiment, the metadata may indicate that more than one node is currently storing the predetermined portion of the file in its cache.

Further, method 700 may proceed with operation 706, where a request is sent by the metadata node to one or more of the plurality of data nodes to transfer the predetermined portion of the file stored in the cache of the data node to a persistent storage of the data node, such that the predetermined portion of the file is only stored within a cache of a single one of the plurality of data nodes within the clustered computing system. In one embodiment, the metadata node may send the request to a storage daemon within each of the one or more of the plurality of data nodes. In another embodiment, the storage daemon may manage the transfer of the portion of the file from the cache of the node to the persistent storage of the node.

Further still, in one embodiment, the request may be sent by the metadata node to all but one of the plurality of data nodes currently storing the predetermined portion of the file in a cache of the data node. In another embodiment, the metadata node may determine the single node to store the predetermined portion of the file randomly, based one or more predetermined criteria, etc. For example, the single node determined to cache the predetermined portion of the file may include a node that is identified as currently caching another portion of the file.

In this way, the metadata node may optimize cache usage by nodes within the clustered computing system by eliminating redundant cache storage of portions of files. This may improve a diversity of data cached within the clustered computing system, which may improve a speed/performance of data storage and retrieval within the system.

Figure 8:
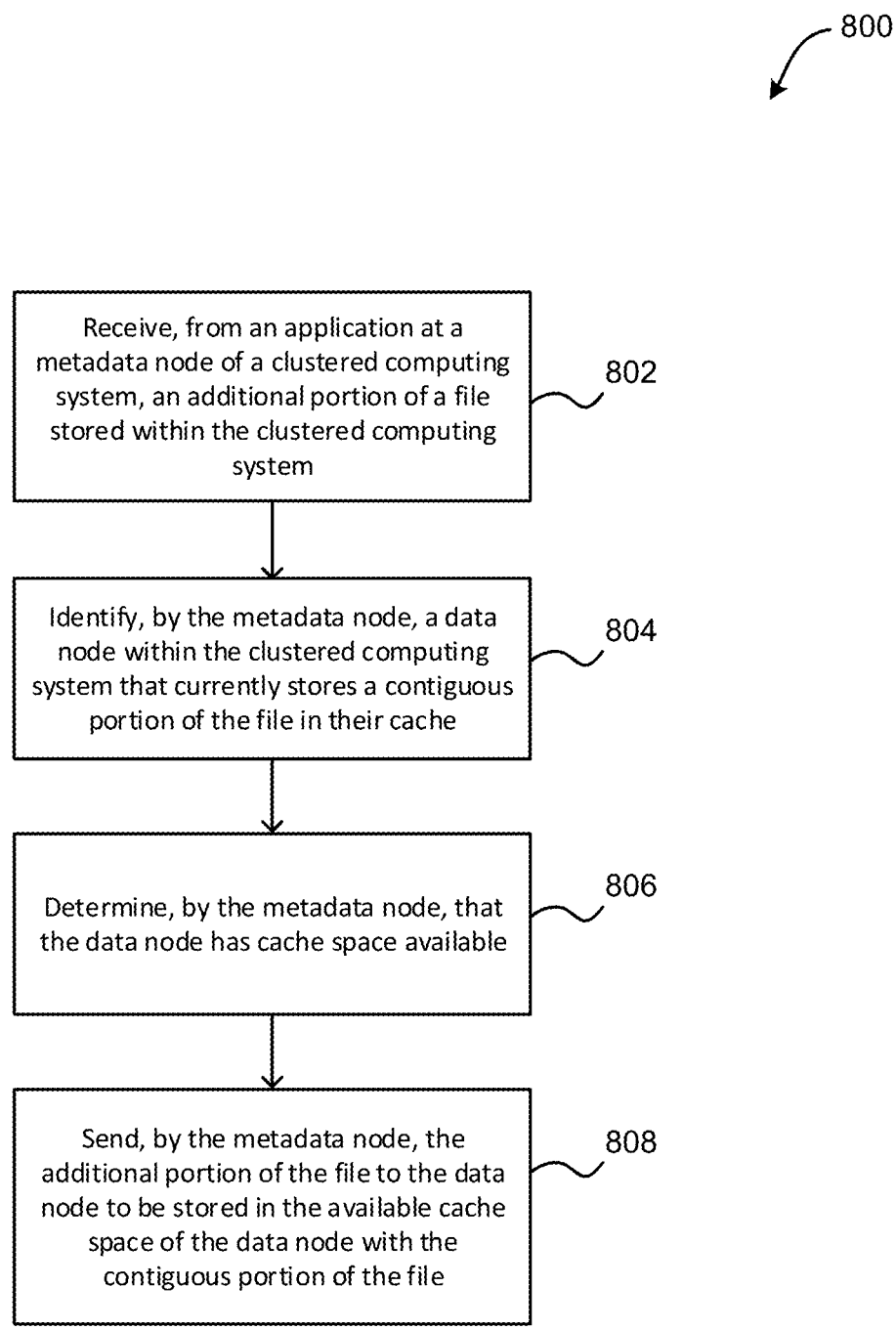
FIG. 8 illustrates a flowchart of a method for writing to an existing file within a clustered computing system, in accordance with one embodiment.

Now referring to FIG. 8, a flowchart of a method 800 for writing to an existing file within a clustered computing system is shown according to one embodiment. The method 800 may be performed in accordance with the present invention in any of the environments depicted in FIGS. 1-4 and 9, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where an additional portion of a file stored within a clustered computing system is received from an application at a metadata node of the clustered computing system. In one embodiment, the additional portion of the file may be received from the application in response to a modification of the file by the application. For example, the additional portion may include a new portion comprising additional data that is added to the file by the application, resulting in the additional portion of the file.

Additionally, method 800 may proceed with operation 804, where a data node within the clustered computing system that currently stores a contiguous portion of the file in their cache is identified by the metadata node. In one embodiment, the contiguous portion of the file may include a contiguous block of data. In another embodiment, the metadata node may store metadata indicating a location of each portion of the file within the clustered computing system. In yet another embodiment, the metadata node may also store metadata indicating whether the predetermined portion of the file is stored within a cache or persistent storage of each storage node storing the predetermined portion of the file.

Further, method 800 may proceed with operation 806, where it is determined by the metadata node that the data node has cache space available. In one embodiment, the metadata node may monitor the storage nodes and may maintain metadata indicating a current availability of a cache for each of the data nodes. In another embodiment, the metadata node may ping the data node with a request asking whether the data node has available cache space.

Further still, method 800 may proceed with operation 808, where the additional portion of the file to the data node is sent by the metadata node to be stored in the available cache space of the data node with the contiguous portion of the file. In one embodiment, the metadata node may send the additional portion of the file to a storage daemon within the data node. In another embodiment, the storage daemon may manage the storage of the additional portion of the file within the cache of the node. In yet another embodiment, the metadata node may prioritize data nodes with one or more cached contiguous portions of the file when sending out the additional portion of the file for storage. The metadata node may send the additional portion of the file to a data node with available cache space that does not currently store a contiguous portion of the file in their cache only when no data nodes are available that currently store a contiguous portion of the file in their cache and have cache space available.

In this way, contiguous portions of the file may be stored in the same cache of a single data node, which may optimize data transfer associated with the file. For example, if the cache of the data node is needed by an application/service/process with higher priority, the contiguous portions of the file may be flushed to persistent storage of the storage node in a single operation. Additionally, applications requesting the file may by directed by the metadata node to retrieve the contiguous portions of the file from the cache of the single data node, which may reduce a number of data nodes from which file data is retrieved.

Figure 9:
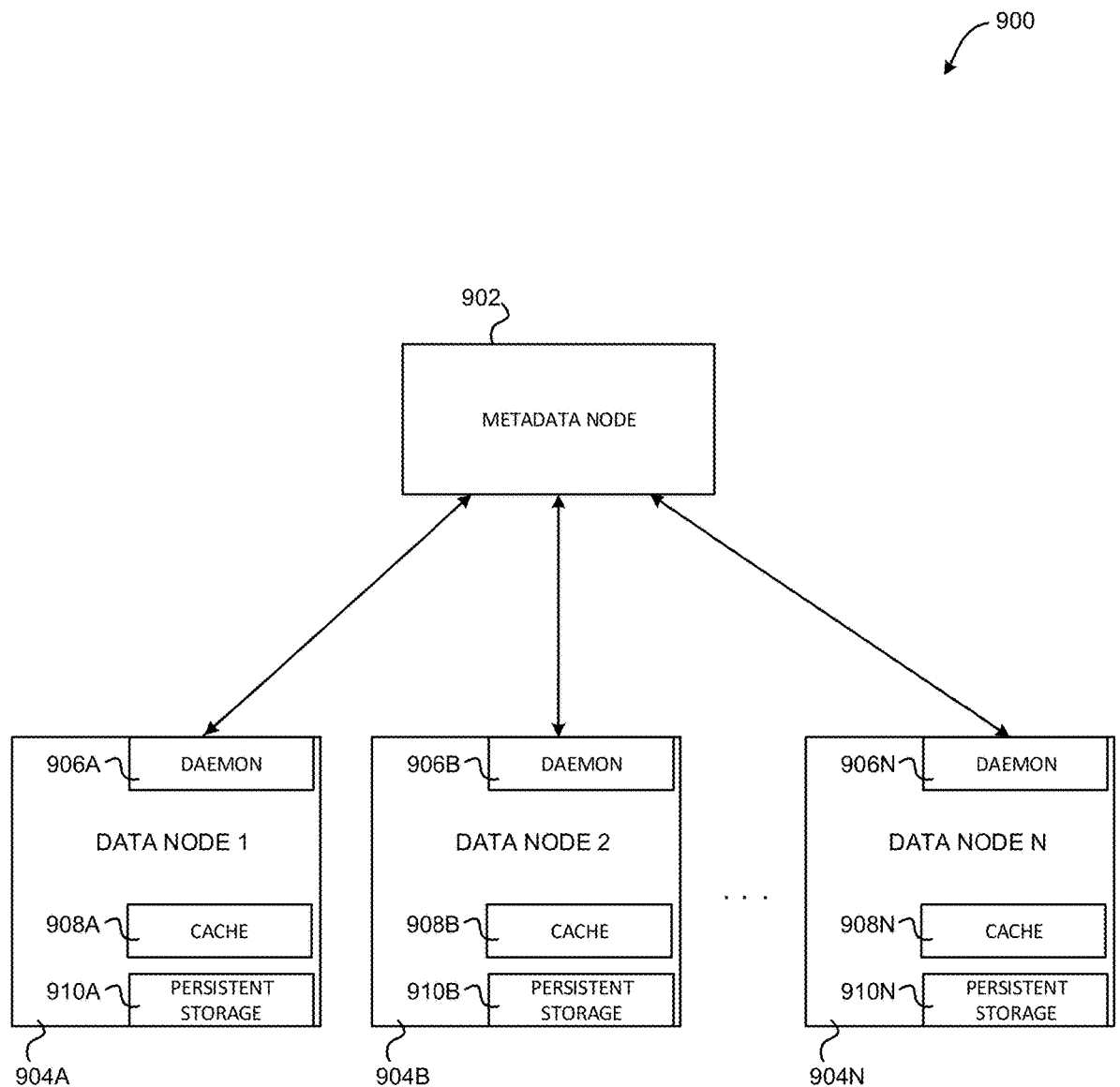
FIG. 9 illustrates an exemplary clustered computing system, in accordance with one embodiment.

FIG. 9 illustrates an exemplary clustered computing system 900, according to one exemplary embodiment. As shown, a metadata node 902 is in communication with a plurality of data nodes 904A-N. Each of the plurality of data nodes 904A-N includes its own storage daemon 906A-N, cache 908A-N, and persistent storage 910A-N.

In one embodiment, the metadata node 902 receives a request for a file from an application. The application may be located within the clustered computing system 900 or external to the clustered computing system 900. In response to receiving the request, the metadata node 902 determines a plurality of portions that comprise the file. The metadata node 902 then identifies locations of caches 908A-N currently storing any of the plurality of portions, where only one cache stores a predetermined portion of the file (e.g., there are not multiple copies of the portions cached).

For any portions that are not currently cached, the metadata node 902 then identifies a location of each of these portions in persistent storage 910A-N. A single location of each portion of the file is then returned from the metadata node 902 to the application, where the single location may include a location of one of the caches 908A-N or a persistent storage 910A-N location (where cache locations are prioritized over persistent storage locations).

In another embodiment, a storage daemon 906A of a first data node 904A may determine that a process having a predetermined priority is requesting use of the first cache 908A of the first data node 904A. In response, the storage daemon 906A may trigger a flush of all file data stored within the first cache 908A to first persistent storage 910A. The storage daemon 906A may then notify the metadata node 902 that the flush has occurred, and the metadata node 902 may update its records (e.g., a database, etc.) to change the location of the associated file data from the first cache 908A of the first data node 904A to the first persistent storage 910A of the first data node 904A.

Further, the metadata node 902 may identify a second data node 904B that currently stores the associated file data in its second persistent storage 910B, and that currently has available space in its second cache 908B. The metadata node 902 may then instruct a daemon 906B of the second data node 904B to transfer the associated file data from second persistent storage 910B of the second data node 904B to a second cache 908B of the second data node 904B.

In yet another embodiment, the metadata node 902 may determine that the same portion of a file is stored in both a first cache 908A of a first data node 904A as well as a second cache 908B of a second data node 904B. In response to this determination, the metadata node 902 may send a message to the daemon 906B of the second data node 904B requesting that the daemon 906B transfer the portion of the file from the second cache 908B to the second persistent storage 910B. The second data node 904B may be chosen for the transfer due to a predetermined priority order, or due to a determination that the first data node 904A currently stores one or more additional contiguous portions of the file in its first cache 908A.

The metadata node 902 may then send a message to the daemon 906B of the second data node 904B requesting that the daemon 906B transfer a different portion of a different file (e.g., a portion of a file that is not currently cached within the system 900, etc.) from the second persistent storage 910B to the second cache 908B.

In still another embodiment, the metadata node 902 may receive an additional portion of a file that is currently stored within the clustered computing system 900. The metadata node 902 may then determine that a first cache 908A of a first data node 904A currently stores a contiguous portion of the file. In response to the determination, the metadata node 902 may send the additional portion of the file to the daemon 906A of the first data node 904A, and may instruct the daemon 906A of the first data node 904A to store the additional portion of the file in the first cache 908A of the first data node 904A.

In this way, the metadata node 902 may manage storage of file data in both the caches 908A-N and persistent storage 910A-N of the data nodes 904A-N, by communicating with storage daemons 906A-N within each of the data nodes 904A-N.

Efficient Utilization of IBM Spectrum Scale File System Pinned Memory for Big Data Applications Big data Hadoop ecosystems currently store intermediate data in the local file system mount point such as ext3, ext4 and the combiners and partitioners have to read the data from the persistent storage such as local disks.

This is an I/O intensive process since the data gets written in disk storage. It requires sufficient page faults to bring the data into in memory and process it using the combiner and partitioner applications. This adds latency since there is a large amount of intermediate data input generated in this process depending on the amount of data being processed in Mapper and Reducers. This can pose severe limitations when the Hadoop workloads are running high I/O and compute intensive workloads on HDFS file systems.

In response, a transparency data node uses a DMRPC (Dynamic Memory Remote Procedure) protocol to query IBM Spectrum Scale page pool memory which is a kernel pinned memory to store the intermediate data generated by big data map/reduce applications. This reduces the latency of combining the intermediate data to generate the complete map/reduce applications result in combiner and partitioner phases.

DMRPC (Dynamic Memory Remote Procedure Call)

The GPFS page pool is used to cache user data and file system metadata. The page pool mechanism allows GPFS to implement read as well as write requests asynchronously. Increasing the size of page pool increases the amount of data or metadata that GPFS can cache without requiring synchronous I/O. The amount of memory available for a GPFS page pool on a particular node may be restricted by the operating system and other software running on the node.

The optimal size of the page pool depends on the needs of the application and effective caching of its re-accessed data. For systems where applications access large files, reuse data, benefit from GPFS prefetching of data, or have a random I/O pattern, increasing the value for page pool may prove beneficial. However, if the value is set too large, GPFS will start with the maximum that the system allows.

HDFS Transparency Protocol provides access to the freed-up IBM spectrum scale pinned kernel pages as an in memory ramfs to the Hadoop applications (Mapreduce/ Yarn, Hive, Hbase) running any workloads. Once the applications have finished running the Hadoop workloads it is returned back to page pool memory by initiating the DMRPC Return request.

Exemplary Implementation Details

The DFS daemon process will allocate a part of the main memory—it will pin the memory throughout the time it is up and running. This memory cannot be freed/used by the kernel until the DFS daemon itself deallocates it off when it ceases to run.

Each of the data nodes in the cluster will borrow all the free memory possible from the distributed file system daemon that it will be hosting. Out of this borrowed memory, each of the nodes may create a tempFS in memory and be open for the Hadoop applications to store any data it needs for processing.

In one embodiment, available free memory may be queried in this pinned region of memory of the DFS daemon, and if there is spare memory, it may ask to free up that memory for using it temporarily to boost the applications in a Hadoop environment.

In a typical HDFS environment there are one or more name nodes and multiple data nodes. The name nodes usually hold information on where the data resides and which data node is in charge of storing it to the persistent storage below. Each of the data nodes tempFS can now hold any data that the Hadoop application needs to store on it. Any data block in a typical Hadoop environment will have three data replicas stored across different data nodes.

Each of the data nodes can now cache any part of the data that is needed for processing by the application, on its in-memory tempFS in such a way that, the first data node will cache the data to the limit of its tempFS size limit. Once the data node 1 has its tempFS full, it signals the next data node (2) to cache from the next block of data to its limit and hand control to the 3rd data node. The data nodes can also synchronize within them how much data each of them can hold in its tempFS before it can get full—and equally distribute the caching job across all the available data nodes to cache into their memory tempFS. Now the name node will be tuned to also store a location of which data node holds the data of interest in its in-memory tempFS (cached in the memory FS).

This model not only makes sure that all the data of interest is parallelly cached on to the in-memory tempFS for faster access by the applications, but also ensures that all the necessary data is cached in a round robin fashion across all the data nodes—as and when the applications complete processing the previous chunk of data available in the tempFS.

Since the needed data can be located on any data node's in-memory tempFS, as compared to caching it on the data node holding it first copy, the Hadoop applications need to be able to dynamically move the computation to the data node which is holding the data chunk of interest.

Besides serving the purpose of reading data from disk, these in-memory tempFS can also be used to store the intermediate data being generated by the Hadoop applications. To store such data, the tempFS uses the traditional swap-out swap-in mechanism used in caching models, to swap out the older (LRU) unused data, and store the newer generated data copies. Since the intermediate data generated is only stored on each of these data nodes' memory tempFS, it is possible that a node failure can result in important data loss and the applications having to start all over again by starting from scratch. To avoid these conditions there will be in-built policies in the tempFS to back it up on a regular basis to the persistent DFS. This data backup to the DFS is done in the background and in a transparent way such that the applications won't see any latency because of backing it up to the persistent storage.

When all the applications are done, the data nodes can free up these in-memory tempFS and return the memory back to the DFS daemon which released the memory for the Hadoop applications in the first place.

In one embodiment, a Dynamic Memory Remote Procedure Call (DMRPC) of a transparency data node in a Hadoop Spectrum File system (HDFS) protocol of IBM Spectrum Scale may be used for storing intermediate data in big data applications. Additionally, part of the pinned memory from the IBM Spectrum Scale File system's page pool may be dynamically queried and allocated for the creation of a tempFS, wherein the tempFS can be used for faster access of intermediate data for data intensive map/reduce big data applications.

In another embodiment, a backup of the data in this tempFS may be enabled to the Spectrum Scale file system in a periodic or event triggered manner, to maintain a persistent copy of the intermediate shuffle data so that applications can continue in case of failures. In yet another embodiment, smart prefetching of intermediate data may be performed from the Spectrum Scale File system back to the tempFS during page faults, in case the tempFS that is created is too small to hold all the intermediate data generated.

In yet another embodiment, data may be cached into the tempFS in a round robin method across the data nodes in the cluster, so that the applications can gain access to all the data faster from the in-memory tempFS. Name nodes may hold all the information about which nodes are caching which part of the file or a complete file, and they may be able to redirect the application to such data nodes so the applications can do their processing directly on the data nodes holding the data in their memory as compared to having it on the persistent file system.

In still another embodiment, an overall mechanism may focus on the read performance as well, since most of the Hadoop applications are read intensive in nature, and disk I/O, as such are latency prone. This may depend on the underlying file system's read performance.

Exemplary Protocol Implementation

In one embodiment, a DMRPC Query is initiated by HDFS Transparency. The DMRPC Query includes querying the memory usage of gpfs.pagepool from mmfs/gpfs daemon. The DMRPC Query returns the non-zero status and the amount of kernel pages which can be allotted by IBM Spectrum Scale MMFS Daemon. This value is used for DMRPC fetch to get the kernel pinned Memory. For example, DMRPC fetch requests the memory based on the response of the DMRPC query to the mmfs daemon.

Once the DMRPC Fetch is successful, the Memory pages are mounted as a tempFS filesystem by a HDFS transparency data node of an IBM Spectrum Scale file system. The intermediate data of the map is stored in the tempFS by a transparency data node. The combiner/reducer reads the Intermediate data from this tempFS that is mounted by the transparency data node. Once the Hadoop workloads have finished operation, the tempFS is unmounted by the transparency data node and the kernel pages are returned to the IBM Spectrum Scale page pool memory by a DMRPC return request. The DMRPC return includes a return of memory back to the mmfs/gpfs daemon to be sent back to the gpfs.pagepool.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, from an application at a metadata node of a clustered computing system, a request for a file, where the file is divided and stored as a plurality of different portions on different data nodes within the clustered computing system;
identifying, by the metadata node, a subset of the data nodes within the clustered computing system where a portion of the file is stored;
in response to determining, by the metadata node, a data node within the subset of the data nodes storing the portion of the file in a cache of the data node:
returning to the application, by the metadata node, a location of the portion of the file at the data node storing the portion of the file in the cache of the data node; and
in response to determining, by the metadata node, that no data node within the subset of the data nodes is currently storing the portion of the file in a cache of the node:
returning to the application, by the metadata node, a location of the portion of the file at the data node storing the portion of the file in persistent storage of the data node,
determining one data node of the subset of the data nodes that has available cache space, and
sending a request to the determined data node to transfer the portion of the file from the persistent storage of the data node to the cache of the data node, such that one of the subset of the data nodes stores the portion of the file in the cache of the data node, and the remaining data nodes of the subset of the data nodes store the portion of the file in persistent storage of the data node.

2. The computer-implemented method of claim 1, comprising:
   receiving, at the metadata node of the clustered computing system from one of the data nodes within the clustered computing system, an indication that a portion of the file stored at the data node has been moved from the cache of the data node to a persistent storage of the data node;
   updating, at the metadata node, a record to indicate that the portion of the file is currently stored in the persistent storage of the data node;
   identifying, by the metadata node, additional data nodes within the clustered computing system that currently store the portion of the file in persistent storage;
   determining, by the metadata node, one of the additional data nodes that has available cache space;
   sending a request by the metadata node to the determined additional data node to transfer the portion of the file stored in the persistent storage at the determined additional data node to the cache of the determined additional data node;
   identifying, by the metadata node of the clustered computing system, a plurality of data nodes within the clustered computing system that currently store a predetermined portion of the file;
   determining, by the metadata node, that more than one of the plurality of data nodes is currently storing the predetermined portion of the file in the cache of the data node; and
   sending a request by the metadata node to one or more of the plurality of data nodes to transfer the predetermined portion of the file stored in the cache of the data node to a persistent storage of the data node, such that the predetermined portion of the file is only stored within the cache of a single one of the plurality of data nodes within the clustered computing system;
   receiving, from the application at the metadata node of the clustered computing system, an additional portion of the file stored within the clustered computing system;
   identifying, by the metadata node, a data node within the clustered computing system that currently stores a contiguous portion of the file in the cache of the data node;
   determining, by the metadata node, that the data node has cache space available; and
   sending, by the metadata node, the additional portion of the file to the data node to be stored in the available cache space of the data node with the contiguous portion of the file.

3. The computer-implemented method of claim 1, comprising:
   identifying, by the metadata node of the clustered computing system, a plurality of data nodes within the clustered computing system that currently store a predetermined portion of the file;
   determining, by the metadata node, that more than one of the plurality of data nodes is currently storing the predetermined portion of the file in the cache of the data node; and
   sending a request by the metadata node to one or more of the plurality of data nodes to transfer the predetermined portion of the file stored in the cache of the data node to a persistent storage of the data node, such that the predetermined portion of the file is only stored within the cache of a single one of the plurality of data nodes within the clustered computing system.

4. The computer-implemented method of claim 1, comprising:
   receiving, from the application at the metadata node of the clustered computing system, an additional portion of the file stored within the clustered computing system;
   identifying, by the metadata node, a data node within the clustered computing system that currently stores a contiguous portion of the file in the cache of the data node;
   determining, by the metadata node, that the data node has cache space available; and
   sending, by the metadata node, the additional portion of the file to the data node to be stored in the available cache space of the data node with the contiguous portion of the file.

5. The computer-implemented method of claim 1, wherein the application is located on a computing device separate from the clustered computing system.

6. The computer-implemented method of claim 1, wherein the application is located on a node of the clustered computing system.

7. The computer-implemented method of claim 1, wherein multiple instances of a single portion of the file are stored on different data nodes within the clustered computing system.

8. A computer program product for caching file data within a clustered computing system, the computer program product comprising a computer readable storage medium having program instructions embodied therewith, wherein the computer readable storage medium is not a transitory signal per se, the program instructions executable by a processor to cause the processor to perform a method comprising:
   receiving, from an application by the processor at a metadata node of a clustered computing system, a request for a file, where the file is divided and stored as a plurality of different portions on different data nodes within the clustered computing system;
   identifying, by the processor at the metadata node, a subset of the data nodes within the clustered computing system where a portion of the file is stored;
   in response to determining, by the processor at the metadata node, a data node within the subset of the data nodes storing the portion of the file in a cache of the data node:
   returning to the application, by the processor at the metadata node, a location of the portion of the file at the data node storing the portion of the file in the cache of the data node; and
   in response to determining, by the processor at metadata node, that no data node within the subset of the data nodes is currently storing the portion of the file in a cache of the node:
      returning to the application, by the processor at the metadata node, a location of the portion of the file at the data node storing the portion of the file in persistent storage of the data node,
      determining one data node of the subset of the data nodes that has available cache space, and
      sending, by the processor at the metadata node, a request to the determined data node to transfer the portion of the file from the persistent storage of the data node to the cache of the data node, such that one of the subset of the data nodes stores the portion of the file in the cache of the data node, and the remaining data nodes of the subset of the data nodes store the portion of the file in persistent storage of the data node.

9. The computer program product of claim 8, further comprising:
receiving, by the processor at the metadata node of the clustered computing system from one of the data nodes within the clustered computing system, an indication that a portion of the file stored at the data node has been moved from the cache of the data node to a persistent storage of the data node;
updating, by the processor at the metadata node, a record to indicate that the portion of the file is currently stored in the persistent storage of the data node;
identifying, by the processor at the metadata node, additional data nodes within the clustered computing system that currently store the portion of the file in persistent storage;
determining, by the processor at the metadata node, one of the additional data nodes that has available cache space; and
sending a request by the processor at the metadata node to the determined additional data node to transfer the portion of the file stored in the persistent storage at the determined additional data node to the cache of the determined additional data node.

10. The computer program product of claim 8, further comprising:
identifying, by the processor at the metadata node of the clustered computing system, a plurality of data nodes within the clustered computing system that currently store a predetermined portion of the file;
determining, by the processor at the metadata node, that more than one of the plurality of data nodes is currently storing the predetermined portion of the file in the cache of the data node; and
sending a request by the processor at the metadata node to one or more of the plurality of data nodes to transfer the predetermined portion of the file stored in the cache of the data node to a persistent storage of the data node, such that the predetermined portion of the file is only stored within the cache of a single one of the plurality of data nodes within the clustered computing system.

11. The computer program product of claim 8, further comprising:
receiving, from the application by the processor at the metadata node of the clustered computing system, an additional portion of the file stored within the clustered computing system;
identifying, by the processor at the metadata node, a data node within the clustered computing system that currently stores a contiguous portion of the file in the cache of the data node;

determining, by the processor at the metadata node, that the data node has cache space available; and
sending, by the processor at the metadata node, the additional portion of the file to the data node to be stored in the available cache space of the data node with the contiguous portion of the file.

12. The computer program product of claim 8, wherein the application is located on a computing device separate from the clustered computing system.

13. The computer program product of claim 8, wherein the application is located on a node of the clustered computing system.

14. The computer program product of claim 8, wherein multiple instances of a single portion of the file are stored on different data nodes within the clustered computing system.

15. A system, comprising:
a processor; and
logic integrated with the processor, executable by the processor, or integrated with and executable by the processor, the logic being configured to:
receive, from an application at a metadata node of a clustered computing system, a request for a file, where the file is divided and stored as a plurality of different portions on different data nodes within the clustered computing system;
identify, by the metadata node, a subset of the data nodes within the clustered computing system where a portion of the file is stored;
in response to determining, by the metadata node, a data node within the subset of the data nodes storing the portion of the file in a cache of the data node:
return to the application, by the metadata node, a location of the portion of the file at the data node storing the portion of the file in the cache of the data node; and
in response to determining, by the metadata node, that no data node within the subset of the data nodes is currently storing the portion of the file in a cache of the node:
return to the application, by the metadata node, a location of the portion of the file at the data node storing the portion of the file in persistent storage of the data node,
determine one data node of the subset of the data nodes that has available cache space, and
send a request to the determined data node to transfer the portion of the file from the persistent storage of the data node to the cache of the data node, such that one of the subset of the data nodes stores the portion of the file in the cache of the data node, and the remaining data nodes of the subset of the data nodes store the portion of the file in persistent storage of the data node.

* * * * *

UNITED STATES PATENT AND TRADEMARK OFFICE
CERTIFICATE OF CORRECTION

Page 1 of 1

PATENT NO. : 11,126,371 B2
APPLICATION NO. : 16/402917
DATED : September 21, 2021
INVENTOR(S) : Muthu Muthiah et al.

It is certified that error appears in the above-identified patent and that said Letters Patent is hereby corrected as shown below:

On the Title Page

Item [72], replace "Karrthik K. G." with --Karrthik Kalaga Gopalakrishnan--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*